US012651795B2

(12) United States Patent
 Blakstad

(10) Patent No.: US 12,651,795 B2
(45) Date of Patent: Jun. 9, 2026

(54) BATTERY CONNECTOR

(71) Applicant: Griff Aviation AS, Sykkylven (NO)

(72) Inventor: Svein Even Blakstad, Sykkylven (NO)

(73) Assignee: Griff Aviation AS, Sykkylven (NO)

( * ) Notice: Subject to any disclaimer, the term of this patent is extended or adjusted under 35 U.S.C. 154(b) by 666 days.

(21) Appl. No.: 17/999,543

(22) PCT Filed: May 26, 2021

(86) PCT No.: PCT/NO2021/050133
 § 371 (c)(1),
 (2) Date: Nov. 21, 2022

(87) PCT Pub. No.: WO2021/242113
 PCT Pub. Date: Dec. 2, 2021

(65) Prior Publication Data
 US 2023/0207943 A1 Jun. 29, 2023

(30) Foreign Application Priority Data

May 28, 2020 (NO) .................................... 20200628

(51) Int. Cl.
 *H01M 50/249* (2021.01)
 *B60L 53/80* (2019.01)
 (Continued)

(52) U.S. Cl.
 CPC ........... *H01M 50/249* (2021.01); *B60L 53/80*
 (2019.02); *B64U 10/13* (2023.01); *B64U*
 *20/70* (2023.01);
 (Continued)

(58) Field of Classification Search
 CPC ............. H01M 50/249; H01M 50/202; H01M
 50/244; H01M 2220/20; H01M 50/296;
 (Continued)

(56) References Cited

U.S. PATENT DOCUMENTS 4,580,862 A * 4/1986 Johnson ............. H01R 13/6315
 439/585
4,697,859 A * 10/1987 Fisher, Jr. .......... H01R 13/6315
 439/246
 (Continued)

FOREIGN PATENT DOCUMENTS

CN 108394309 A 8/2018
EP 2340951 A2 7/2011
 (Continued)

OTHER PUBLICATIONS

PCT/NO2021/050133, "International Search Report and Written Opinion", dated Sep. 14, 2021, 9 pages.
 (Continued)

*Primary Examiner* — Michael L Dignan
(74) *Attorney, Agent, or Firm* — Kilpatrick Townsend & Stockton LLP

(57) ABSTRACT

A battery connector for connecting a replaceable battery to an aerial vehicle, comprising a housing configured for fixing to one of the replaceable battery and the aerial vehicle. The connector element includes a first connection portion for releasable connection to an external connection element of the other one of the replaceable battery and the aerial vehicle and a second connection portion for fixed connection to the replaceable battery or the aerial vehicle. The connector element is supported in a horizontal direction in the housing by at least one flexible element positioned at least partly between the connector element and the housing and in a vertical direction in the housing by an upper flexible element positioned between an upper part of the connector element and the housing and a lower flexible element positioned between a lower part of the connector element and the housing.

7 Claims, 3 Drawing Sheets

(51) Int. Cl.

| | |
|---|---|
| *B64U 10/13* | (2023.01) |
| *B64U 20/70* | (2023.01) |
| *B64U 50/19* | (2023.01) |
| *B64U 50/30* | (2023.01) |
| *H01M 50/202* | (2021.01) |
| *H01M 50/244* | (2021.01) |
| *B64U 10/14* | (2023.01) |

(52) U.S. Cl.
CPC ............. *B64U 50/19* (2023.01); *B64U 50/30* (2023.01); *H01M 50/202* (2021.01); *H01M 50/244* (2021.01); *B60L 2200/10* (2013.01); *B64D 2221/00* (2013.01); *B64U 10/14* (2023.01); *H01M 2220/20* (2013.01)

(58) Field of Classification Search
CPC ...... B60L 53/80; B60L 2220/10; B60L 50/66; B60L 2260/32; B64U 10/13; B64U 20/70; B64U 50/19; B64U 50/30; B64U 10/14; B64U 50/39; B64D 2221/00; B64D 27/02; B64C 39/024; Y02E 60/10; Y02T 10/70; Y02T 10/7072
See application file for complete search history.

(56) References Cited

U.S. PATENT DOCUMENTS

| | | | | |
|---|---|---|---|---|
| 4,909,748 | A | 3/1990 | Kozono et al. | |
| 6,368,130 | B1 * | 4/2002 | Fukuda | .................. H01R 13/52 439/364 |
| 6,379,071 | B1 * | 4/2002 | Sorvino | ............. H01R 13/6315 403/372 |
| 7,077,697 | B2 * | 7/2006 | Kooiman | ............. H01R 13/743 439/247 |
| 9,742,113 | B1 * | 8/2017 | Bausch | .............. H01R 13/6315 |
| 10,290,958 | B2 * | 5/2019 | Burris | .................. H01R 13/502 |
| 10,978,840 | B2 * | 4/2021 | Paynter | ........... H01R 13/62938 |
| 2019/0348806 | A1 * | 11/2019 | Mizrahi | ................ G06F 1/1656 |
| 2020/0001997 | A1 * | 1/2020 | Qiu | ..................... B64U 30/293 |

FOREIGN PATENT DOCUMENTS

| | | | |
|---|---|---|---|
| EP | 3346556 | A1 | 7/2018 |
| JP | 6090067 | U | 6/1985 |
| JP | 026261 | U | 1/1990 |
| JP | 2019111880 | A | 7/2019 |
| KR | 20200053236 | A | 5/2020 |
| WO | 2017/185487 | A1 | 11/2017 |
| WO | 2019021979 | A1 | 1/2019 |
| WO | 2019/177609 | A1 | 9/2019 |

OTHER PUBLICATIONS

NO 20200628, "Norwegian Search Report", dated Dec. 28, 2020, 2 pages.
JP2022-572786, "Office Action", May 27, 2025, 6 pages.
JP2022-572786, "Notice of Decision to Grant", Oct. 14, 2025, 5 pages.
KR10-2022-7037185, "Office Action", Oct. 17, 2025, 7 pages.

* cited by examiner

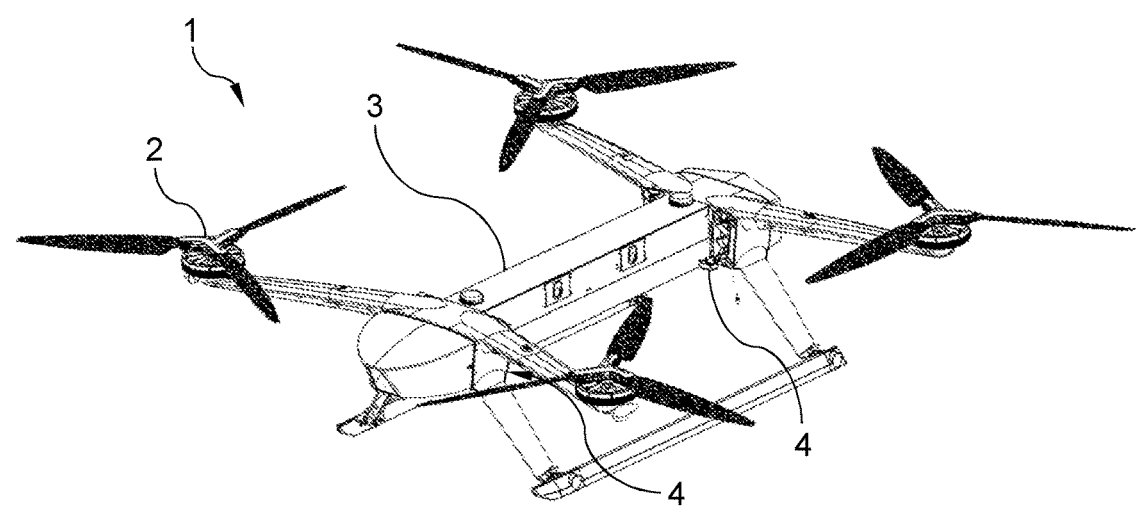
Fig. 1
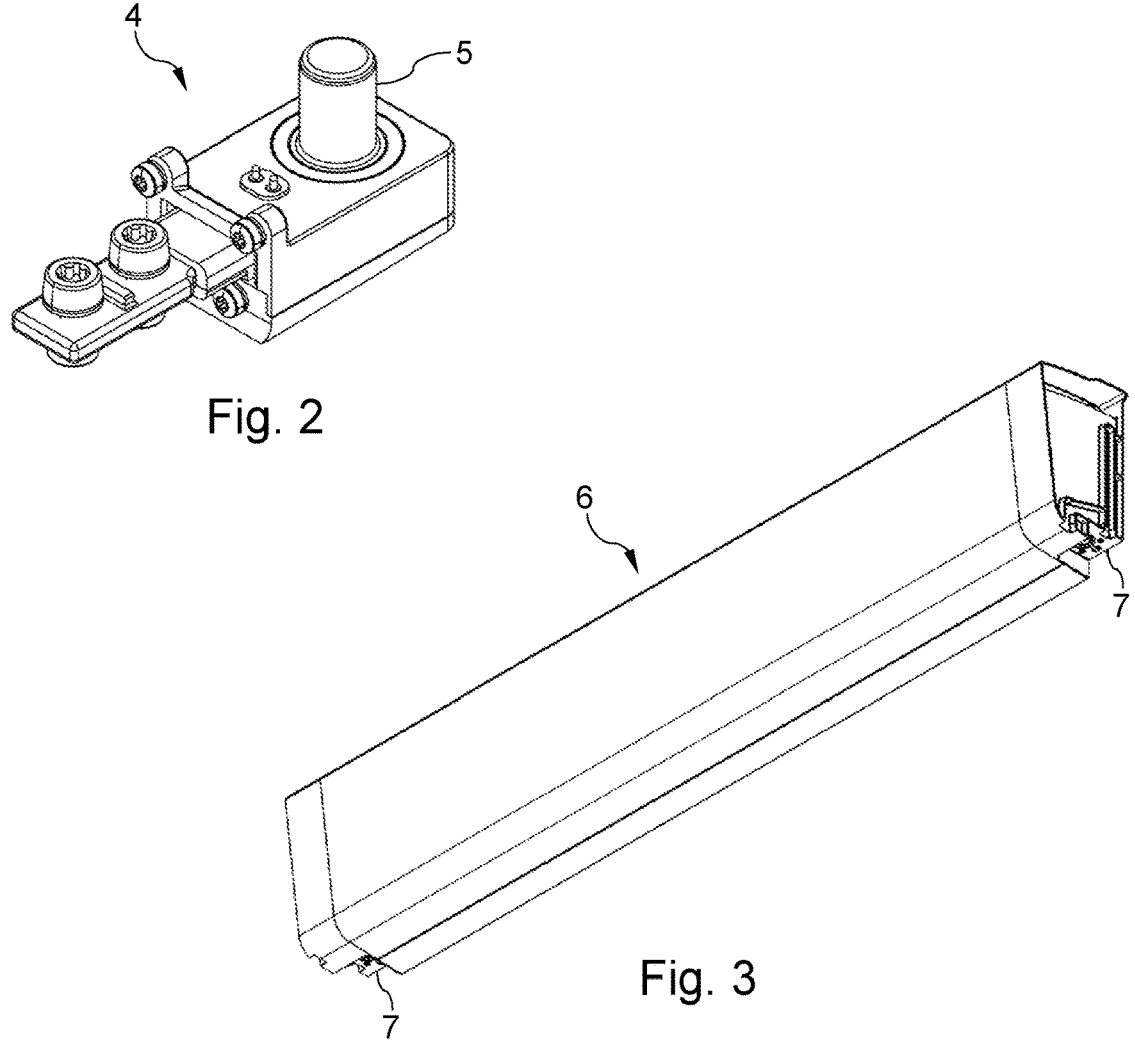
Fig. 2
Fig. 3

BATTERY CONNECTOR

The present invention relates to a battery connector. More specifically, the disclosure relates to a battery connector for connecting a replaceable battery to an aerial vehicle, as defined in the introductory parts of claim 1.

BACKGROUND

A key aspect of aerial vehicles, and in particular drones, is weight. The lighter the aerial vehicle is, the more lifting capacity it may have, and a longer flight-time may be achieved. As such, design of aerial vehicles today are on a large part based on weight-effective designs.

All parts of an aerial vehicle may be optimized in order to reduce weight, while still maintaining safety and reliability. Aerial vehicles are commonly equipped with a replaceable battery such that when the battery has been discharged, it is easy and swift to replace with a fully charged one, in order to maximize flying time. A battery connector for connecting a replaceable battery to an aerial vehicle should also be as light as possible, and should be easy to handle such that the battery replacement can be performed hassle-free and without malfunctioning.

A battery connector commonly comprises a first connection portion for releasable connection to an external connection element of a replaceable battery or an aerial vehicle, and a second connection portion for fixed connection to the other one of the replaceable battery and the aerial vehicle. If the connection portions are fixed, the first connection portion may be exposed to stress as the replaceable battery is replaced, or the aerial vehicle might even be designed non-optimally to allow a replaceable battery to be connected to and removed from a fixed or rigid connection portion.

Wear and tear from a fixed connection portion may also gradually cause the battery connector to malfunction. In order to save weight or to keep the weight as low as possible, it is desirable to utilize as few and as light parts as possible. Known battery connectors are either bulky and complicated, or do not allow sufficient movement of the connection portions.

There is therefore a need for an improved connector to reduce or eliminate the above mentioned disadvantages of known techniques. It is an objective of the present invention to achieve this and to provide further advantages over the state of the art.

Documents useful for understanding the field of technology include CN108394309A, WO2019095275A1 and CN205327435U. CN108394309A describes a UVA battery locating and locking device which comprises a battery and a UVA; a charging male connector and a plurality of locating bumps which are located on the periphery of the male connector are arranged on the battery; a charging female connector, a plurality of connectors and a plurality of elastic blocks are arranged on the UVA. The charging female connector is matched with the charging male connector, the plurality of connectors are connected with the locating bumps in one to one correspondence, and the plurality of elastic blocks are located on the periphery of the charging male connector.

The prior art also includes EP 3346566 A1, which describes a 3-phase undervoltage trip device capable of automatically tripping a circuit breaker based on an under-voltage of a 3-phase line voltage, including lines to which a 3-phase power is applied. The undervoltage trip device is connected to lines to which a 3-phase power is applied and configured to operate to automatically trip a circuit breaker when an open phase condition occurs on any one of three phases of the power.

The prior art also includes EP 2340951 A2, which describes a battery system for an electric vehicle, comprising a battery bay for receiving a battery pack, located on an underside of the electric vehicle. The battery bay comprises a first latch at the underside of the electric vehicle, the first latch comprises a first hook configured to mechanically engage a first striker at a first end of the battery pack; and a second latch at the underside of the electric vehicle, the second latch comprising a second hook configured to mechanically engage a second striker at a second end of the battery pack, wherein the first latch and the second latch are configured to mechanically couple the battery pack to the underside of the electric vehicle by engaging, vertically lifting, and locking the first and second strikers of the battery pack to the electric vehicle substantially simultaneously.

SUMMARY

It is an object of the present invention to mitigate, alleviate or eliminate one or more of the above-identified deficiencies and disadvantages in the prior art and solve at least the above mentioned problem.

According to a first aspect, there is provided a battery connector for connecting a replaceable battery to an aerial vehicle. The battery connector comprises a housing configured for fixing to one of the replaceable battery and the aerial vehicle. The battery connector further comprises a connector element comprising a first connection portion configured for releasable connection to an external connection element of the other one of the replaceable battery and the aerial vehicle. The connector element further comprises a second connection portion configured for fixed connection to the replaceable battery or the aerial vehicle to which the housing is configured to be fixed. The connector element is supported in a horizontal direction in the housing by at least one flexible element positioned at least partly between the connector element and the housing, such that there is space between the connector element and the housing in the horizontal direction. The connector element is supported in a vertical direction in the housing by an upper flexible element positioned between an upper part of the connector element and the housing and a lower flexible element positioned between a lower part of the connector element and the housing, such that there is space between the connector element and the housing in the vertical direction.

According to an embodiment of the invention, the first connection portion of the connector element is supported horizontally in the housing by the at least one flexible element, the upper flexible element and the lower flexible element.

According to an embodiment of the invention, the first connection portion comprises a generally cylindrical outer shape for abutment with the at least one flexible element.

According to an embodiment of the invention, the housing comprises an upper housing part and a separate lower housing part.

According to an embodiment of the invention, the at least one flexible element is secured to the housing between the upper housing part and the lower housing part.

According to an embodiment of the invention, the at least one flexible element comprises at least three separate, flexible elements.

According to an embodiment of the invention, the at least three flexible elements are spaced equally around the connector element.

According to an embodiment of the invention, the at least one flexible element are four separate, flexible elements.

According to an embodiment of the invention, the first connection portion is a female connection portion.

According to an embodiment of the invention, the first connection portion comprises a connector liner.

The present invention will become apparent from the detailed description given below. The detailed description and specific examples disclose preferred embodiments of the invention by way of illustration only. Those skilled in the art understand from guidance in the detailed description that changes and modifications may be made within the scope of the invention.

Hence, it is to be understood that the herein disclosed invention is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an" and "the" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present invention, will be more fully appreciated by reference to the following illustrative and non-limiting detailed description of example embodiments of the present invention, when taken in conjunction with the accompanying figures.

FIG. 1 shows a perspective view of an aerial vehicle without a battery, where external connection elements are exposed.

FIG. 2 shows a detailed perspective view of an embodiment of an external connection element in the form of a male connector.

FIG. 3 shows a perspective view of an embodiment of a replaceable battery comprising battery connectors.

DETAILED DESCRIPTION

Figure 4:
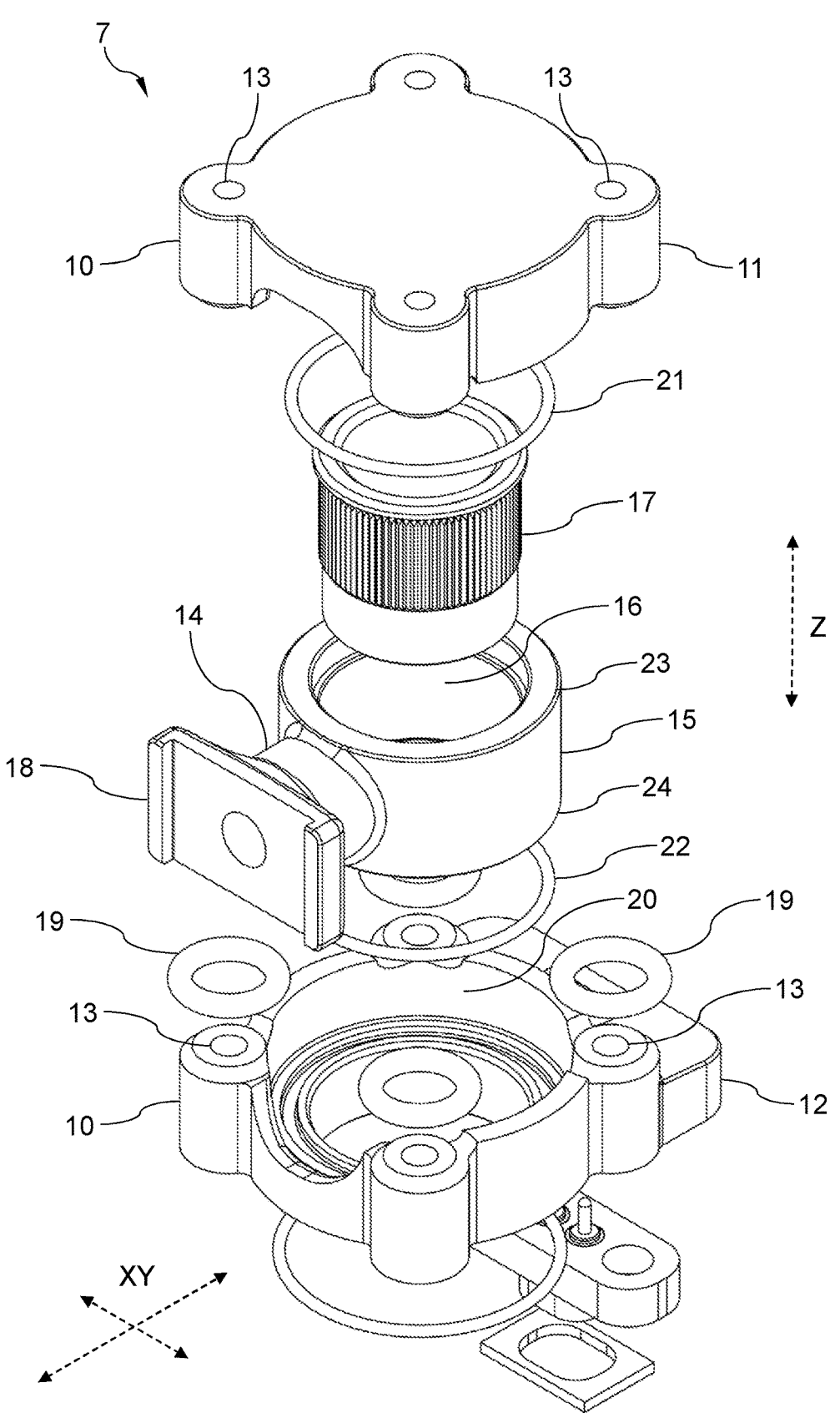
FIG. 4 shows an exploded view of an embodiment of a battery connector.

The present invention will now be described with reference to the accompanying drawings, in which preferred example embodiments of the invention are shown. The invention may, however, be embodied in other forms and should not be construed as limited to the herein disclosed embodiments. The disclosed embodiments are provided to fully convey the scope of the invention to the skilled person.

The following description may use terms such as "horizontal", "vertical", "upper", "lower", "inner", "outer", "forward", "rear", etc. These terms generally refer to the views and orientations as shown in the figures and that are associated with a normal use of the invention. The terms are used for the reader's convenience only and shall not be limiting. A horizontal plane need as such not be an actual horizontal plane, and a vertical direction need not be an actual vertical direction, but as a skilled reader would appreciate, a vertical direction is directed generally perpendicular to a horizontal plane.

Referring initially to FIGS. 1, 2 and 3, an aerial vehicle 1 is illustrated in FIG. 1. The aerial vehicle 1 may be a drone, also referred to as a multicopter, and in the illustrated embodiment the aerial vehicle 1 comprises four motors and rotors 2 connected to a body 3. The body 3 of the aerial vehicle 1 comprises external connection elements 4. The aerial vehicle 1 may comprise two external connection elements 4 on each side, but only one external connection 4 is visible in FIG. 1. The external connection element 4 is illustrated in greater detail in FIG. 2. In the illustrated embodiment, the external connection element 4 is a male connector comprising a pin 5, but in an alternative embodiment it may be a female connector.

The external connection element 4 may be fixed to the aerial vehicle 1 and as such be a rigid element not allowing much movement.

A replaceable battery 6 (illustrated in FIG. 3) can be connected to the body 3 and the external connection elements 4, and as such power the aerial vehicle 1. In the illustrated embodiment, two replaceable batteries 6 can be connected to the aerial vehicle 1, one battery 6 on each side of the body 3. A battery connector 7 is configured for connection to an external connection element 4, and thus connecting the replaceable battery 6 to the aerial vehicle 1 and transmitting electric power from the replaceable battery 6 to the aerial vehicle 1. Each replaceable battery 6 may comprise two battery connectors 7, as illustrated in FIG. 3. In the illustrated embodiment, the battery connector 7 is a female connector, but may in an alternative embodiment be a male connector.

In the illustrated embodiment, the battery connector 7 is fixed to the replaceable battery 6, but the battery connector 7 may in an alternative embodiment be fixed to the aerial vehicle. In this alternative embodiment, the external connection element, male or female, may be fixed to the replaceable battery.

The replaceable battery 6 may be additionally secured to the aerial vehicle 1 by means known in the art such as screws, snap-locks, clips, etc. such that the replaceable battery 6 is securely fixed to the aerial vehicle 1 when it is mounted thereto.

Referring now to FIG. 4, an embodiment of a battery connector 7 is illustrated in an exploded view. The battery connector 7 comprises a housing 10 configured for fixing to one of the replaceable battery 6 and the aerial vehicle 1. The housing 10 may comprise an upper housing part 11 and a lower housing part 12. The lower housing part 12 may be configured for resting against a surface with an opening, and the upper part 11 is configured for placement on top of the lower housing part 11.

The housing 10 may comprise fixing means accommodation 13, so that the housing 10 can be fixed to the replaceable battery or the aerial vehicle. The fixing means accommodation 13 may simply be holes through the housing 10 such that the battery connector 7 can be screwed or otherwise fixed to the replaceable battery or the aerial vehicle, or the fixing means accommodation 13 may be other means known in the art of attaching a housing to a surface.

The fixing means accommodation 13 may also comprise the fixing means such as buckles, clips, etc.

In the illustrated embodiment, the fixing means accommodation 13 extend through both the upper and lower housing parts 11,12, such that if a screw is inserted through the fixing means accommodation 13, the upper housing part 11 is fixed to the lower housing part 12.

The battery connector 7 comprises a connector element 14. The connector element 14 is made of a conducting material, such as metal, and is configured for transmitting electric power from the replaceable battery to the aerial vehicle.

The connector element 14 comprises a first connection portion 15. The first connection portion 15 is configured for releasable connection to the external connection element described with reference to FIGS. 1 and 2. In the illustrated embodiment, where the external connection element is a male connection, the first connection portion 15 comprises an inner cylindrical portion 16 configured for receiving the pin of the external connection element. The first connection portion 15 may also comprise an outer cylindrical shape. The first connection portion 15 may additionally comprise a connector liner 17. The connector liner 17 may ensure a tight fit with the male external connection element, and the connector liner 17 may be a standard product made by a third party supplier, and inserted into the first connection portion 15.

The connector element 14 comprises a second connection portion 18. The second connection portion 18 is configured for fixed connection to either a replaceable battery or an aerial vehicle, as described with reference to FIG. 3. The second connection portion 18 of the illustrated embodiment is fixed to the replaceable battery. The second connection portion 18 is thus configured for fixed connection to the battery cells of the replaceable battery. The second connection portion 18 may be fixedly connected to the replaceable battery by means of e.g. wires welded to the second connection portion 18.

The connector element 14 is supported horizontally in the housing 10 by flexible elements 19. A horizontal plane XY is indicated by two arrows in FIG. 4, and a vertical direction is indicated by the arrow Z. The horizontal plane XY is thus defined as a plane perpendicular to the direction in which the external connection element is inserted into the battery connector 7. The external connection element is connected to the battery connector by pushing it upwards in the vertical direction indicated by arrow Z in FIG. 4, and disconnected from the battery connector by pulling it vertically downwards.

At least a portion of a flexible element 19 is positioned between the connector element 14 and the housing 10, such that there is space between the connector element 14 and the housing 10. The connector element 14 is thus not contacting the housing 10 in the horizontal plane XY. More specifically, at least a portion of the flexible elements 19 are positioned between the first connection portion 15 of the connector element 14 and the housing 10. The flexible elements 19 may be equally spaced around the first connection portion 15, and the battery connector 7 may comprise any number of flexible elements 19. The illustrated embodiment comprises four separate, flexible elements 19. In order to bias the connector element 14 towards a neutral center, at least three flexible elements may be provided in the battery connector. But even one or two flexible elements may be provided, if the flexible element extends sufficiently about the circumference of the first connection portion 15.

The flexible elements 19 of the illustrated embodiment are o-rings, but may as such be any elastic or flexible elements. The housing 10 comprises a cavity 20 where the connector element 14 is positioned, and the flexible elements 19 are positioned in the housing 10 such that a portion of the flexible elements 19 are positioned in the space between the housing 10 and the connector element 14. The connector element 14 abuts the flexible elements 19 such that the connector element 14 is biased in a neutral, aligned position. The flexible elements 19 may be held in place and secured to the housing 10 between the upper housing part 11 and the lower housing part 12. This allows easy and cheap assembling and mounting of the connector 7, as the upper housing part 11 is fixed to the lower housing part 12 and the flexible elements 19 are simultaneously fixed in the housing 10.

The connector element 14 is supported vertically in the housing 10 by an upper flexible element 21 and a lower flexible element 22. The upper flexible element 21 is positioned between an upper portion 23 of the first connection portion 15 and the housing 10. In the illustrated embodiment, the upper flexible element 21 is positioned between the upper portion 23 and the upper housing part 11. The upper flexible element 21 may be an o-ring. The lower flexible element 22 is positioned between a lower portion 24 of the first connection portion 15 and the housing 10. In the illustrated embodiment, the lower flexible element 22 is positioned between the lower portion 24 and the lower housing part 12. The lower flexible element 22 may be an o-ring. There is as such space between the connector element 14 and the housing 10, and the connector element 14 is not contacting the housing 10 in the vertical direction Z. In the illustrated embodiment, the upper flexible element 21, connector element 14 and lower flexible element 22 are sandwiched between the upper housing part 11 and the lower housing part 12.

Upon entry, the pin of an external connection element may not be entered straight or centered into the battery connector 7 due to lack of space, narrow entry angles, etc. Due to the flexible properties of the flexible elements 19, the upper flexible element 21 and the lower flexible element 22, the connector element 14 can be moved somewhat relative to the housing 10. When the housing 10 is fixed to a surface of a rechargeable battery or similar, the connector element 14 may be moved and tilted inside the housing 10. When the external connection element 4 (not shown in FIG. 4, see FIG. 2) is fully inserted, or fully pulled out, the connector element 14 is centered in the housing because of the flexible elements 19, the upper flexible element 21 and the lower flexible element 22. This allowed movement of the connector element 14 provides effortless entry and exit of the corresponding external connection element 4 with minimal wear and tear of the components. The battery connector 7 as described is a very simple and lightweight construction that may transmit up to 500A continuously.

Figure 5:
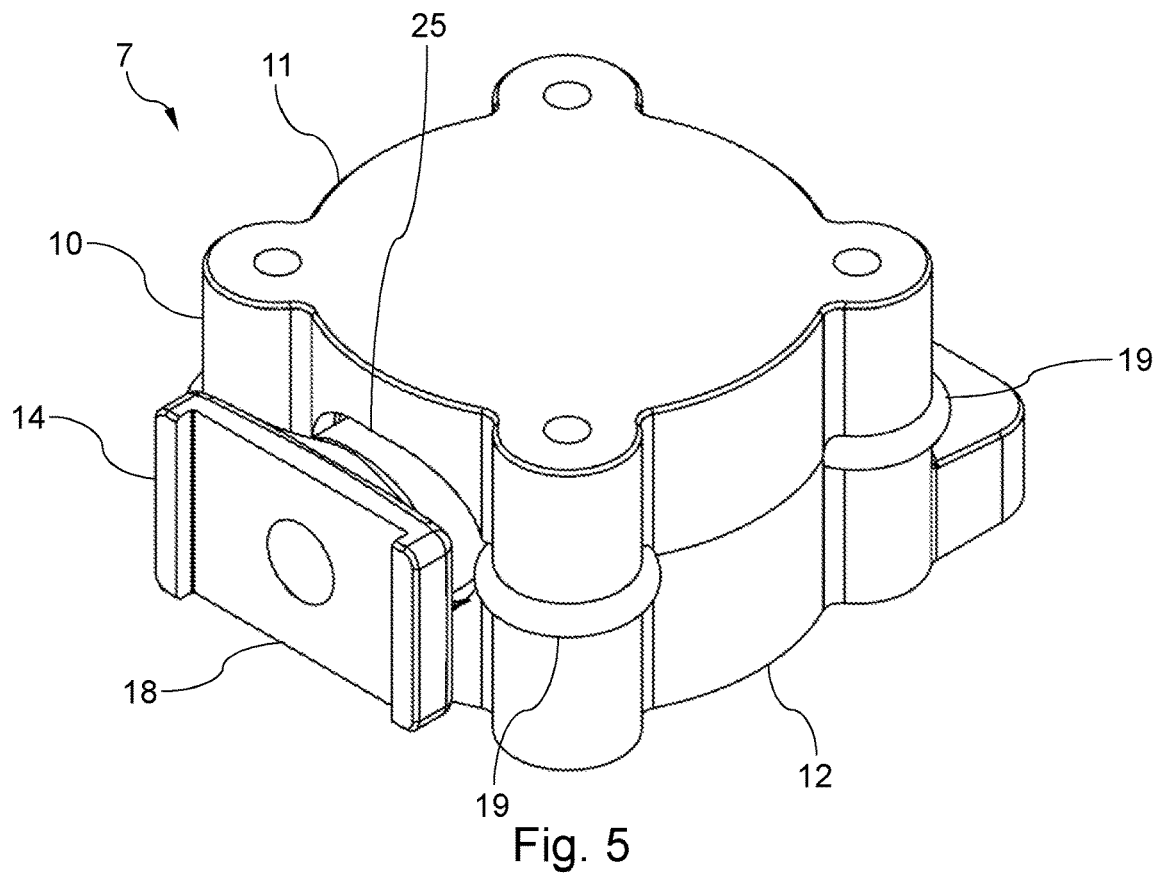
FIG. 5 shows a detailed perspective view of an embodiment of a battery connector.

Referring now to FIG. 5, an assembled battery connector 7 is illustrated. The flexible elements 19 are retained between the upper housing part 11 and the lower housing part 12. The flexible elements 19 may be torus-shaped, and due to this shape a portion of the flexible elements 19 may be exposed on the outside of the housing 10. The second connection portion 18 of the connector element 14 may extend outside the housing 10 through an opening 25. The second connection portion 18 can be connected to e.g. a battery cell by means of wires, as described previously. The opening 25 is larger than the connector element 14 where it extends through the opening 25, such that there is space between the opening 25 and the connector element 14. The opening 25 is thus not contacting the connector element 14, and the connector element 14 is as such allowed to move inside the opening 25, without the housing 10 restricting the movement of the connector element 14.

Figure 6:
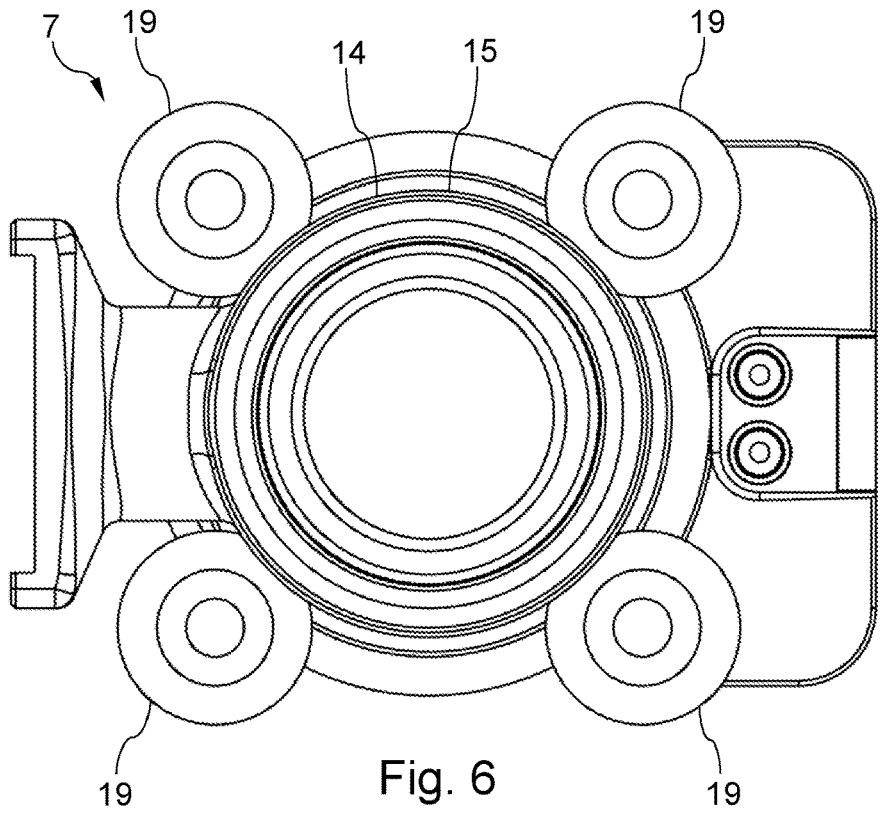
FIG. 6 shows a top view of an embodiment of a battery connector where an upper housing part has been removed for illustrating purposes.

Referring now to FIG. 6, the figure shows a top view (i.e. looking down into the XY plane along the Z-axis as described with reference to FIG. 4) of the battery connector 7. The upper housing part has been removed for illustrating purposes. As is clear from the figure, the four flexible elements 19 are biasing and supporting the connector element 14 in the horizontal plane. More particular, the flexible elements 19 are biasing and supporting the first connection portion 15 in the horizontal plane.

The person skilled in the art realizes that the present invention is not limited to the preferred embodiments described above. The person skilled in the art further realizes that modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A battery connector for connecting a replaceable battery to an aerial vehicle, comprising:

a housing configured for fixing to one of the replaceable battery and the aerial vehicle, wherein the housing comprises an upper housing part and a separate lower housing part; and a connector element comprising:

a first connection portion configured for releasable connection to an external connection element of the other one of the replaceable battery and the aerial vehicle;

a second connection portion configured for fixed connection to the replaceable battery or the aerial vehicle to which the housing is configured to be fixed,

wherein the connector element is supported in a horizontal direction in the housing by at least one flexible element positioned at least partly between the connector element and the housing, such that there is space between the connector element and the housing in the horizontal direction, and wherein the at least one flexible element is secured to the housing between the upper housing part and the lower housing part, wherein the connector element is supported in a vertical direction in the housing by an upper flexible element positioned between an upper part of the connector element and the housing and a lower flexible element positioned between a lower part of the connector element and the housing, such that there is space between the connector element and the housing in the vertical direction, and wherein the first connection portion of the connector element is supported horizontally in the housing by the at least one flexible element, the upper flexible element and the lower flexible element.

2. The battery connector of claim 1, wherein the first connection portion comprises a generally cylindrical outer shape for abutment with the at least one flexible element.

3. The battery connector of claim 1, wherein the at least one flexible element comprises at least three separate flexible elements.

4. The battery connector of claim 3, wherein the at least three separate flexible elements are spaced equally around the connector element.

5. The battery connector of claim 1, wherein the at least one flexible element comprises four separate, flexible elements.

6. The battery connector of claim 1, wherein the first connection portion comprises a female connection portion.

7. The battery connector of claim 6, wherein the first connection portion comprises a connector liner.

* * * * *